United States Patent
Cao et al.

(10) Patent No.: US 11,545,915 B2
(45) Date of Patent: Jan. 3, 2023

(54) POWER GENERATOR, WAVE ENERGY CONVERTER OR SENSOR APPARATUS FOR WATER WAVE ENERGY HARVESTING

(71) Applicant: Board of Trustees of Michigan State University, East Lansing, MI (US)

(72) Inventors: Changyong Cao, Okemos, MI (US); Yaokun Pang, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 216 days.

(21) Appl. No.: 17/132,459

(22) Filed: Dec. 23, 2020

(65) Prior Publication Data

US 2021/0211072 A1 Jul. 8, 2021

Related U.S. Application Data

(60) Provisional application No. 62/958,452, filed on Jan. 8, 2020.

(51) Int. Cl.
*H02N 1/04* (2006.01)
*H02N 1/10* (2006.01)
(Continued)

(52) U.S. Cl.
CPC ............... *H02N 1/04* (2013.01); *F03B 13/10* (2013.01); *F03B 13/14* (2013.01); *H02N 1/10* (2013.01); *H02N 11/002* (2013.01)

(58) Field of Classification Search
CPC .......... H02N 1/04; H02N 1/10; H02N 11/002; F03B 13/14; F03B 13/10; F03B 13/12
(Continued)

(56) References Cited

U.S. PATENT DOCUMENTS

| 4,990,813 A | 2/1991 | Paramo |
| 8,022,563 B2 | 9/2011 | Lemieux |

(Continued)

FOREIGN PATENT DOCUMENTS

| KR | 2016-0148755 A | 12/2016 |
| KR | 10-1727242 B1 | 4/2017 |

(Continued)

OTHER PUBLICATIONS

Q. Shi, H. Wang, T. He and C. Lee, "Triboelectric Balls as Three-Dimensional Vibrational Energy Harvesters and Self-Powered Sensors," 2018 IEEE 13th Annual International Conference on Nano/Micro Engineered and Molecular Systems (NEMS), 2018, pp. 487-490, doi: 10.1109/NEMS.2018.8556936 (Year: 2018).*

(Continued)

*Primary Examiner* — Burton S Mullins
(74) *Attorney, Agent, or Firm* — Harness, Dickey & Pierce, PLC

(57) ABSTRACT

A power generator or sensor apparatus is provided. In another aspect, a power generator is used for water wave energy harvesting. A further aspect provides a power generator including a buoyant, waterproof and/or enclosed outer shell, at least one enclosed inner shell located within the outer shell, a first plurality of balls located between the outer and inner shells, a second plurality of balls located within the inner shell, and spaced apart electrodes affixed to an interior surface of the outer shell. Moreover, an aspect of the present power generator uses fluid, such as water wave movement and wind blowing, to cause nested shells to move which moves multiple balls therein between spaced apart electrodes to generate triboelectric charges or energy for a variety of applications.

27 Claims, 9 Drawing Sheets

(51) Int. Cl.
H02N 11/00 (2006.01)
F03B 13/14 (2006.01)
F03B 13/10 (2006.01)

(58) Field of Classification Search
USPC ..................................... 290/53; 60/495–507
See application file for complete search history.

(56) References Cited

U.S. PATENT DOCUMENTS

| | | | |
|---|---|---|---|
| 9,394,875 | B2 | 7/2016 | Wang et al. |
| 9,394,876 | B2 | 7/2016 | Zuo et al. |
| 9,543,860 | B2 | 1/2017 | Wang et al. |
| 9,571,009 | B2 | 2/2017 | Wang et al. |
| 10,069,441 | B2 * | 9/2018 | Jiang ................. H02N 1/04 |
| 10,333,430 | B2 * | 6/2019 | Wang ................. F03B 13/14 |
| 10,439,517 | B2 * | 10/2019 | Wang ................. H02N 1/04 |
| 10,574,155 | B2 | 2/2020 | Song et al. |
| 2013/0222115 | A1 | 8/2013 | Davoodi et al. |
| 2016/0218640 | A1 | 7/2016 | Wang et al. |
| 2020/0374604 | A1 | 11/2020 | Park et al. |
| 2021/0257932 | A1 * | 8/2021 | Lee ................. G01C 19/5783 |

FOREIGN PATENT DOCUMENTS

| | | | | |
|---|---|---|---|---|
| KR | 2017-0043243 A | | 4/2017 | |
| KR | 2020-0005296 A | | 1/2020 | |
| WO | WO 2014169665 | * | 10/2014 | ............... H02N 1/04 |

OTHER PUBLICATIONS

R. Esteves et al., "Experimental Evaluation of TENGs for Energy Harvesting in Maritime Applications," OCEANS 2019—Marseille, 2019, pp. 1-4, doi: 10.1109/OCEANSE.2019.8867376 (Year: 2019).*

W. Wang, X. Feng, K. Wang and L. Li, "Triboelectric Nanogenerator: A Hope to Collect Blue Energy," 2019 4th International Conference on Control, Robotics and Cybernetics (CRC), 2019, pp. 157-161, doi: 10.1109/CRC.2019.00040 (Year: 2019).*

Chen et al., "Bladeless-Turbine-Based Triboelectric Nanogenerator for Fluid Energy Harvesting and Self-Powered Fluid Gauge," Advanced Materials Technologies 1800560 (2018).

Gong et al., "Capturing Flow Energy From Ocean And Wind," MDPI Energies Review (2019).

Hu et al., "Recent progress in piezotronics and tribotronics," Nanotechnology 30 (2019).

Jiang et al., "Structural Optimization of Triboelectric Nanogenerator for Harvesting Water Wave Energy," Beijing Institute of Nanoenergy and Nanosystems.

Jiang et al., "Spring-assisted triboelectric nanogenerator for efficiently harvesting water wave energy," Nano Energy 31 (2017) pp. 560-567.

Lee et al., "A Spherical Hybrid Triboelectric Nanogenerator for Enhanced Water Wave Energy Harvesting," MDPI Micromachines (2018) 9, 598.

Lin et al., "A Triboelectric Nanogenerator-Based Smart Insole For Multifunctional Gait Monitoring," Advanced Materials Technologies, (2018) 1800360.

Nie et al., "Electrically Responsive Materials and Devices Directly Driven by the High Voltage of Triboelectric Nanogenerators," Advanced Functional Materials, Triboelectric Nanogenerators Review, (2018) 1806351.

Quin et al., "High Energy Storage Efficiency Triboelectric Nanogenerators with Unidirectional Switches and Passive Power Management Circuits," Advanced Functional Materials, (2018) 1805216.

Tian et al., "A Shared-Electrode and Nested-Tube Structure Triboelectric Nanogenerator for Motion Energy Harvesting," MDPI Micromachines, (2019) 10, 656.

Wang et al., "Sustainably power wearable electronics solely by biomechanical energy," Nature Communications (Sep. 28, 2016).

Wang et al., "Toward the blue energy dream by triboelectric nanogenerator networks," Nano Energy 38 (2017) 9-23.

Wu et al., "Triboelectric Nanogenerator: A Foundation of the Energy for the New Era," Advanced Energy Materials, (2018) 1802906.

Xu et al., "A highly-sensitive wave sensor based on liquid-solid interfacing triboelectric nanogenerator for smart marine equipment," manuscript, Nano Energy (2018).

Yin et al., "Structure and Dimension Effects on the Performance of Layered Triboelectric Nanogenerators in Contact-Separation Mode," ACS Nano (Dec. 24, 2018).

Yong et al., "Highly reliable wind-rolling triboelectric nanogenerator operating in a wide wind speed range," www.nature.com/ScientificReports, 6:33977, DOI: 10.1038/srep33977, (Jun. 10, 2016).

Wang et al., "An Ultra-Low-Friction Triboelectric-Electromagnetic Hybrid Nanogenerator for Rotation Energy Harvesting and Self-Powered Wind Speed Sensor," ACS Nano article, (2018) 12, 9433-9440.

Wu, et al., "A Hybridized Triboelectric-Electromagnetic Water Wave Energy Harvester Based on a Magnetic Sphere," ACS Nano article, (2019) 13, 2349-2356.

* cited by examiner

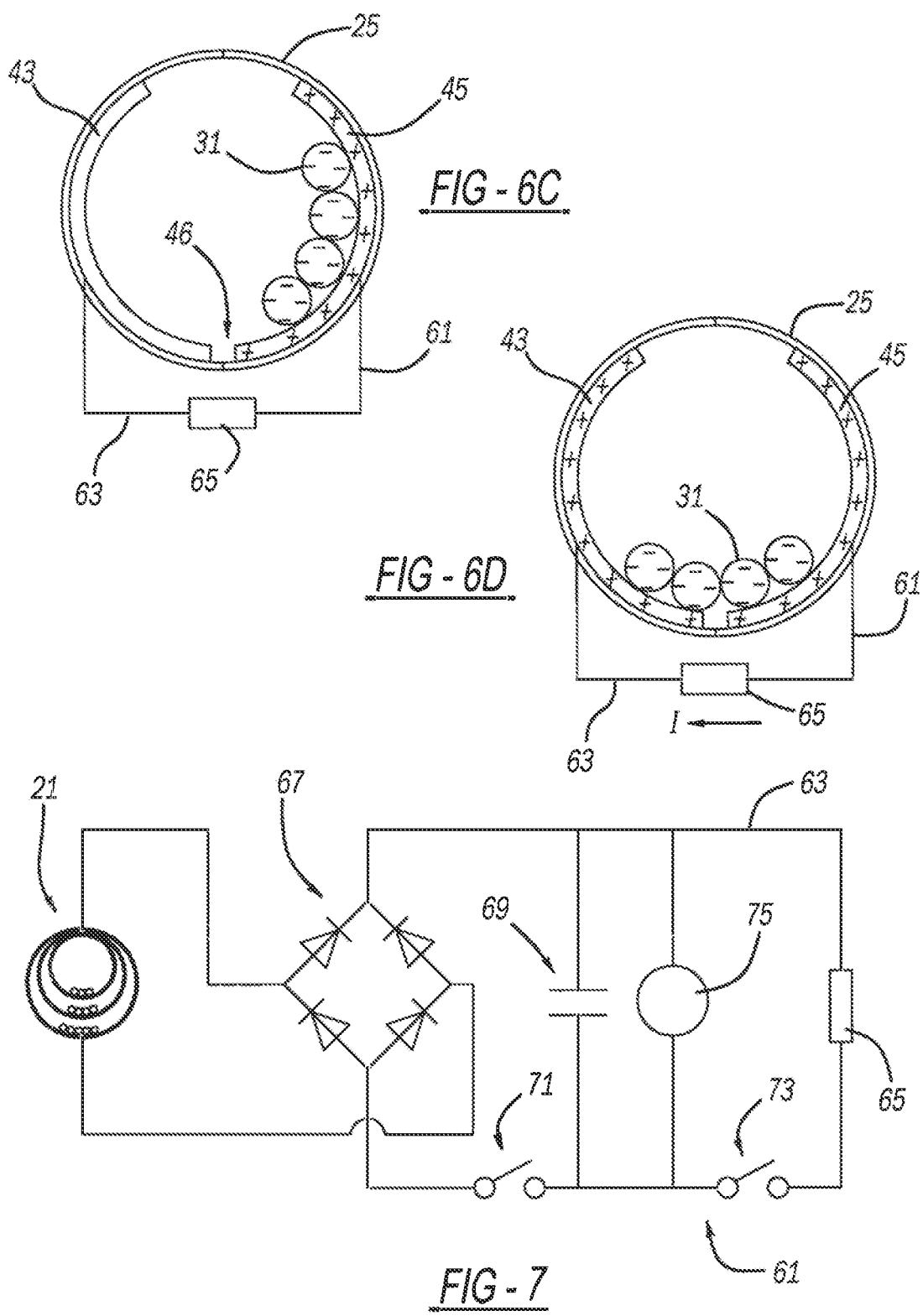

US 11,545,915 B2

POWER GENERATOR, WAVE ENERGY CONVERTER OR SENSOR APPARATUS FOR WATER WAVE ENERGY HARVESTING

CROSS-REFERENCE TO RELATED APPLICATIONS

The present application claims priority to U.S. provisional patent application Ser. No. 62/958,452 filed on Jan. 8, 2020, which is incorporated by reference herein.

BACKGROUND AND SUMMARY

The present disclosure generally pertains to power generators or sensors, and more particularly to a power generator or sensor apparatus for water wave energy harvesting.

Ocean wave energy has many promising advantages like high power density, wide distribution and independence of time of day, weather or seasons. It is estimated that the global power by waves breaking around the coastlines worldwide is around 2-3 TW. However, developing effective energy harvesting devices that can reliably extract that energy and withstand the ocean environment is challenging, and up to now there is still a lack of cost-effective energy harvesting technologies to exploit this renewable energy resource.

Over the years, different kinds of energy harvesters have been attempted to capture the energy from ocean tides or ocean waves based on electro-magnetic generators ("EMGs"). These conventional devices, however, exhibit low energy harvesting efficiency at low ocean wave frequencies and have the drawbacks of complex design, high cost and corrosion in seawater. Therefore, the development of a new kind of low-cost, robust and highly efficient wave energy harvester is desirable for harvesting energy especially from low-frequency water waves.

More recently, triboelectric nanogenerators ("TENGs") have been experimented with for converting mechanical energy into electricity based on the coupled effect of triboelectrification and electrostatic induction. Compared with traditional EMGs, TENGs are advantageous for ocean wave energy harvesting due to their superior efficiency in capturing low-frequency (<3 Hz) wave energy as well as low-cost and simplicity in installation of the devices. Examples of experimental TENGs can be found in: J. Nie et al., "Electrically Responsive Materials and Devices Directly Driven by the High Voltage of Triboelectric Nanogenerators," Adv. Funct. Mater. (2018) at 1806351; C. Wu et al, "Triboelectric Nanogenerator: A Foundation of the Energy for the New Era," Adv. Energy Mater. (2018) at 1802906; T. Jiang et al., "Structural Optimization of Triboelectric Nanogenerator for Harvesting Water Wave Energy," ACS Nano (2015); U.S. Pat. No. 9,571,009 entitled "Rotating Cylindrical and Spherical Triboelectric Generators" which issued to Wang et al., on Feb. 14, 2017; and U.S. Pat. No. 9,394,875 entitled "System For Harvesting Water Wave Energy" which issued to Wang et al. on Jul. 19, 2016. The prior patents are incorporated by reference herein. However, these conventional TENG experiments typically utilize a single large ball moving within a single structure, resulting in a low energy harvesting efficiency and wastage of the limited volume space in the device.

In accordance with the present invention, a power generator or sensor apparatus is provided. In another aspect, a power generator is used for water wave energy harvesting. A further aspect provides a power generator including a buoyant, waterproof and/or enclosed outer shell, at least one enclosed inner shell located within the outer shell, a first plurality of balls located between the outer and inner shells, a second plurality of balls located within the inner shell, and spaced apart electrodes affixed to an interior surface of the outer shell. Moreover, an aspect of the present power generator uses fluid, such as water wave movement, to cause nested shells to move which moves multiple balls therein between spaced apart electrodes to generate triboelectric charging or energy. Methods of manufacturing and using nested shells with multiple freely movable balls therein, are also provided.

The present apparatus is advantageous over conventional devices since the present apparatus more efficiently generates electrical charges or energy, especially at low-frequency wave motions. Furthermore, the present apparatus advantageously maximizes energy generation within a small packaging area by nesting multiple sets of electrodes and/or using multiple balls which can freely rotate between a pair of the electrodes. Moreover, it is also envisioned that the present apparatus is more cost effective to manufacture and has a lighter weight as compared to various traditional devices. Additional features and advantageous of the present apparatus will become apparent from the following description and appended claims taken in conjunction with the associated drawings.

BRIEF DESCRIPTION OF THE DRAWINGS

FIGS. 6A-D are a set of diagrammatic views showing different movement conditions of the present apparatus;

FIG. 7 is an electrical diagram for each shell of the present apparatus;

DETAILED DESCRIPTION

Figure 1:
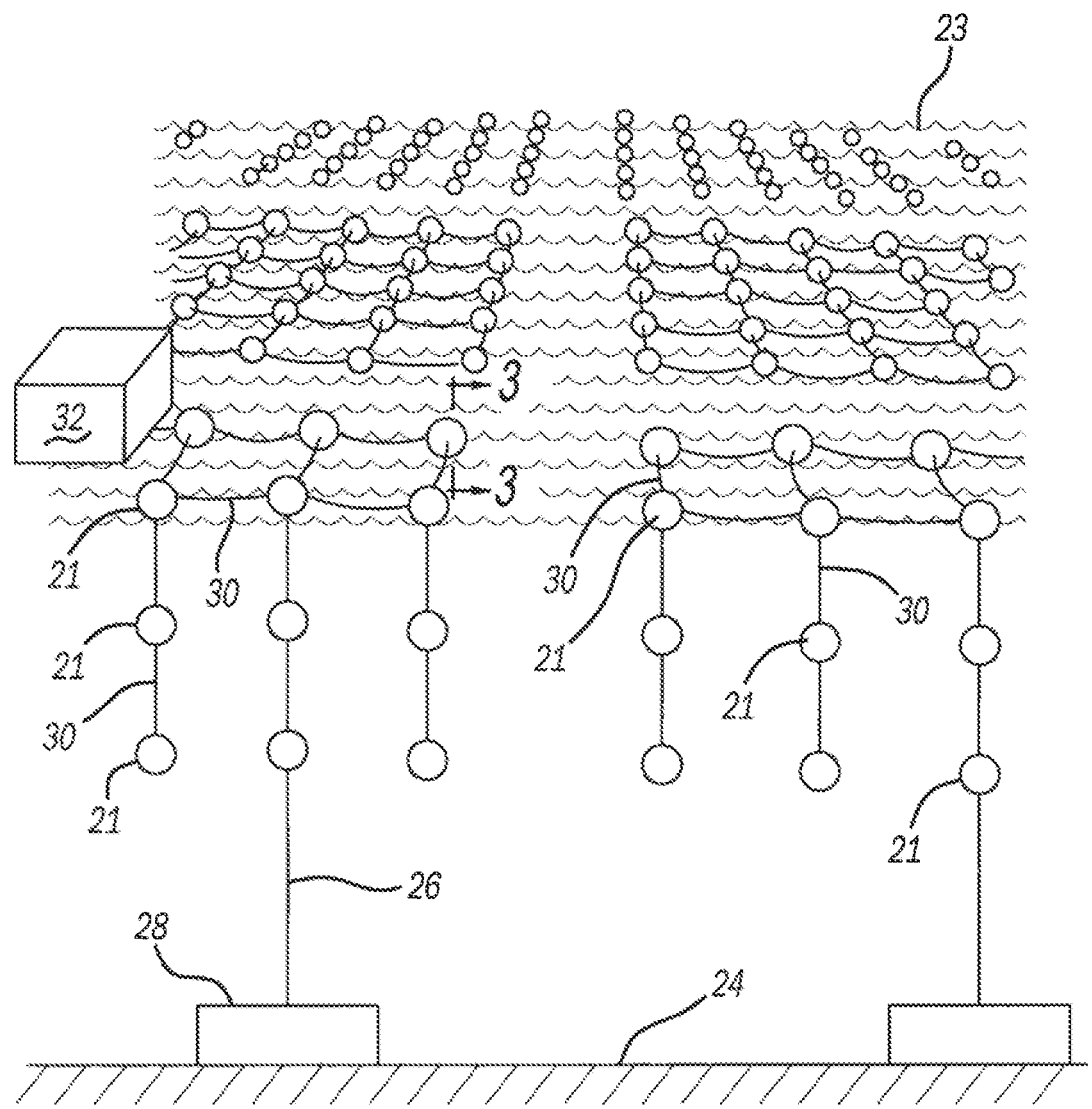
FIG. 1 is a diagrammatic perspective view showing the present power generator or sensor apparatus for water wave energy harvesting.
Figure 2:
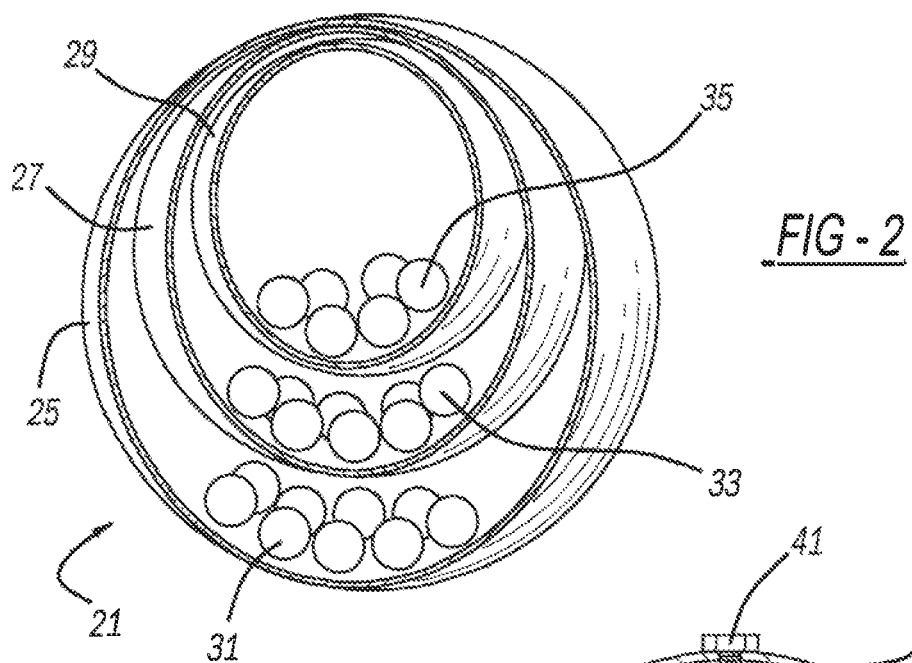
FIG. 2 is a fragmentary perspective view showing the present apparatus.
Figure 3:
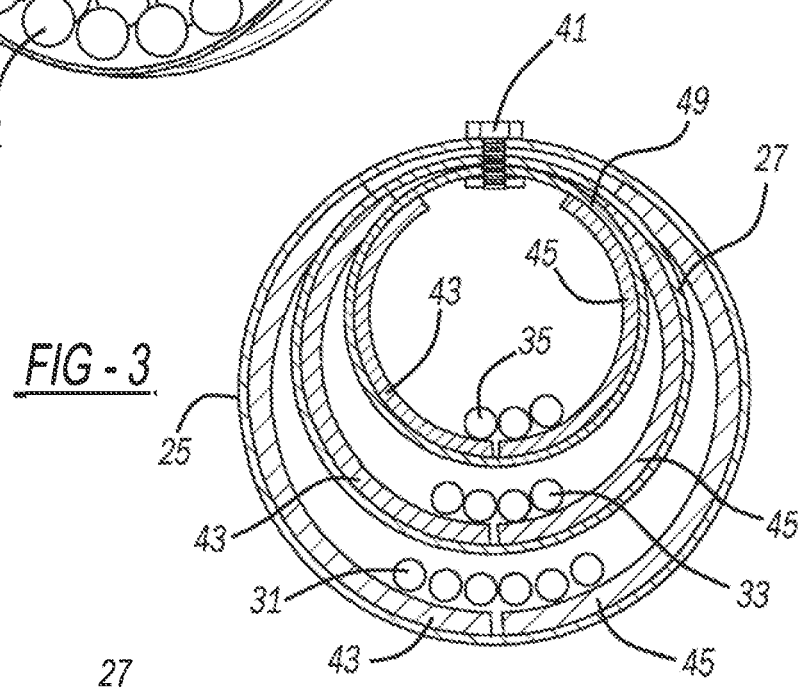
FIG. 3 is a cross-sectional view, taken along line 3-3 of FIG. 1, showing the present apparatus.
Figure 4:
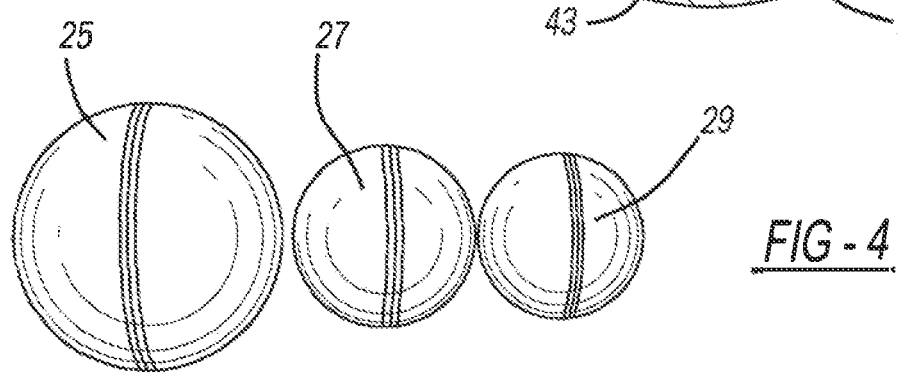
FIG. 4 is an exploded side elevational view showing multiple shells of the present apparatus.
Figure 5:
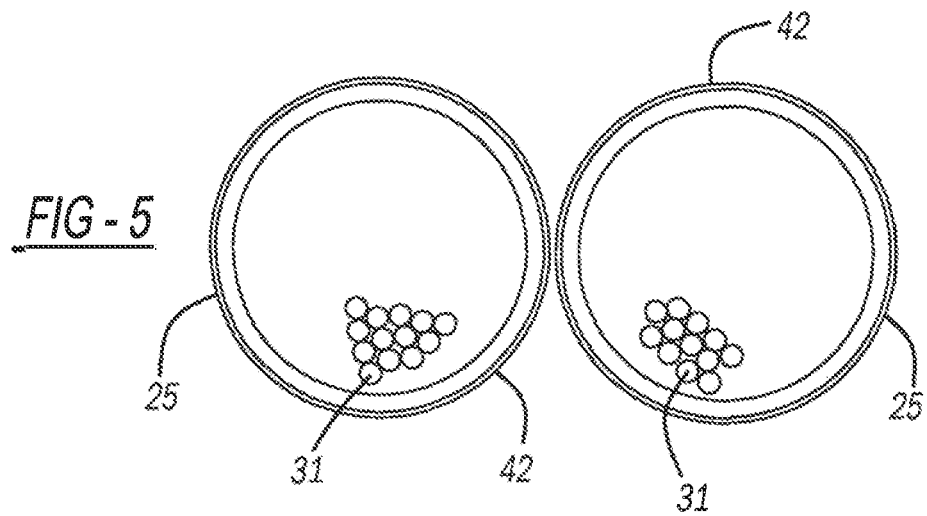
FIG. 5 is a side elevational view showing an outermost shell of the present apparatus in an opened position with a set of balls therein.

A preferred embodiment of a hierarchically structured triboelectric nanogenerator ("HS-TENG") apparatus 21 is employed for energy harvesting in ocean or lake water waves 23, as can be observed in FIG. 1. A three-dimensional array of HS-TENG apparatuses 21 float on top of and/or are partially or fully submerged in the water, and are moored to a floor 24 by cables 26 and an anchor block 28. Electrical lines 30 connect adjacent HS-TENG apparatuses 21 and also the apparatuses to a power storage or transmission unit 32.

Referring now to FIGS. 2-5, HS-TENG apparatus 21 preferably includes three hierarchical levels by nesting three differently sized generally spherical shells 25, 27 and 29 containing multiple sets of balls 31, 33 and 35, respectively, located in open air spaces or areas between the neighboring shells. This obtains full utilization of the limited space volume in the apparatus and increases the contact areas between the moving balls and electrodes. The shells are preferably made of an acrylic polymer and the balls are preferably a polytetra-fluoroethylene ("PTFE") material.

The exemplary three-level HS-TENG apparatus 21 nests multiple spherical shells together, and includes an outer shell 25, a smaller diameter intermediate shell 27, and an even smaller diameter inner shell 29, each completely surrounding the other when assembled. These shells are secured together at a top thereof by a fastener 41, such as a threaded bolt and nut, rivets, welds, adhesive, or the like. Each of the shells is created as two hemispheres which are adhesively or sonic welded together at equator edges 42 in a waterproof manner.

Two copper or copper-alloy electrodes 43 and 45, with a splitting gap 46 (see FIG. 6A) of approximately 3-5 mm therebetween at bottom and side edges, are deposited onto an interior surface of each spherical shell 25, 27 and 29 using copper conductive paint, which has good adhesion strength with the acrylic shells, superior conductivity and satisfactory durability. A large gap may be present adjacent a top of the electrodes to allow for shell fastening thereat. PTFE balls 31, 33 and 35 can freely move or roll back and forth on top of electrodes 43 and 45 inside of the hierarchical shells driven by small wave agitations. Each of electrodes 43 and 45 are preferably generally hemispherical (such as a few degrees less than 180° to allow for top and bottom gaps). However, it is alternately envisioned that each shell may instead contain multiple alternating pairs of electrodes, such as four or six, with curved interior surfaces.

The working principle of the present HS-TENG apparatus 21 is based on a freestanding mode of synergistically combined contact triboelectrification and electrostatic induction. For each hierarchical level in the HS-TENG apparatus, as shown in FIGS. 6A-6D, PTFE balls 31 (by way of example, but applicable to all of the shell layers) will serve as the freestanding friction layer, and when the small balls roll in spherical shell 25, inner surfaces of dielectric layer of electrodes 43 and 45, and PTFE balls 31 will have opposite electrical charge signs (+ or −). As the rolling balls move back and forth along the internal surface of the shell under actuation (due to wave motion), the negative charges on its surface induce positive charges to flow between the two electrodes on the shell through an external electrical circuit 61.

Figure 6A:
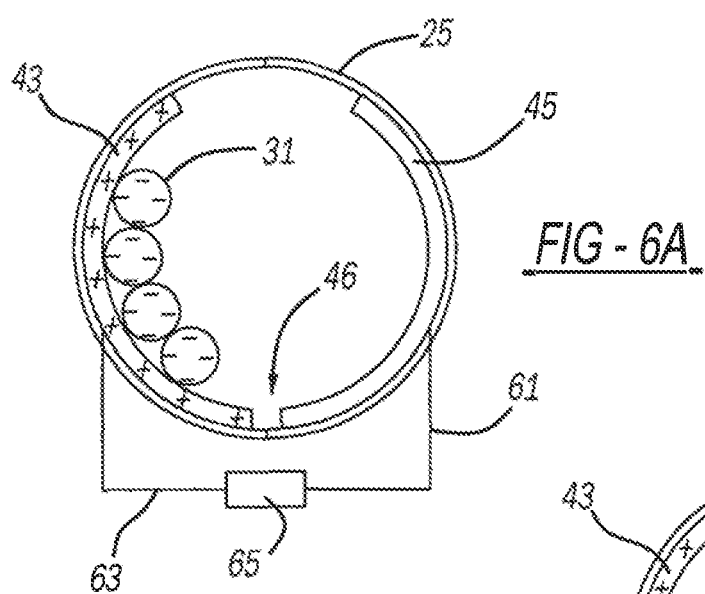
Figure 6B:
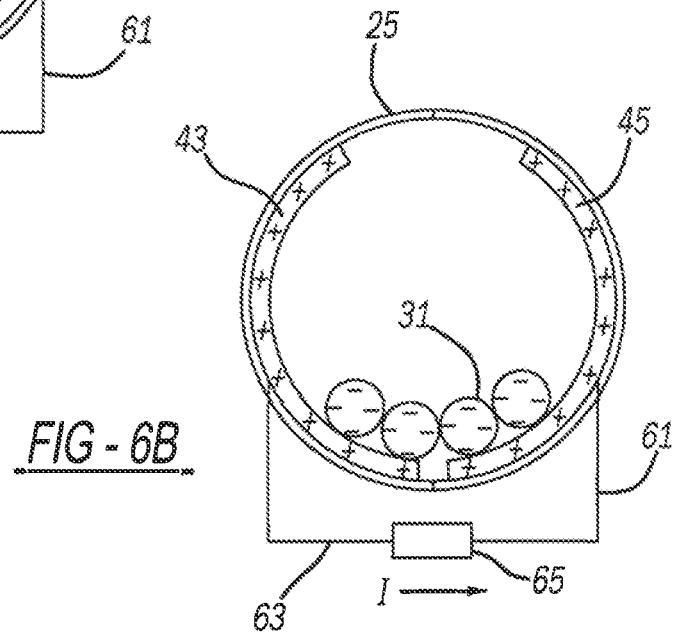

In detail, at the initial stage shown in FIG. 6A, balls 31 are in contact with left-hand electrode 43. Due to the different abilities of attracting electrons between Cu and PTFE, electrons are injected from the Cu electrode to the PTFE balls, thereby respectively generating positive and negative triboelectric charges on the Cu and PTFE surfaces in the saturated state. Under wave agitation, balls 31 then roll toward right electrode 45, as is illustrated in FIG. 6B, and the free electrons are transferred from right-hand electrode 45 to left-hand electrode 43 to balance the electric field, leading to a positively induced charge on the right-hand electrode. When balls 31 are rolled further in the illustrated counter-clockwise direction in FIG. 6C and are separated from the left-hand electrode and fully in contact with the right-hand electrode, all the electrons will be driven to the left-hand electrode. Next, as shown in FIG. 6D, balls 31 roll back from right-hand electrode 45 to left-hand electrode 43 in a clockwise direction and the free electrons flow back to the right-hand electrode, forming a complete cycle of the electricity generation process. There is an electrical potential difference between the two electrodes to drive the electron flow in external circuit 61.

The present apparatus employs multiple balls 31, 33 and 35 within each shell 25, 27 and 29, respectively. For example, at least three and more preferably at least six PTFE balls are associated with each shell. The multiple balls for each shell of the present HS-TENG apparatus 21 have superior output performance as compared to a single ball TENG ("SB-TENG") of the same size. With the optimized design for the HS-TENG unit, a HS-TENG network formed by a 3×3 device array can supply energy to dozens of light-emitting diodes and power an electronic thermometer for monitoring or sensing water conditions, such as its temperature, salinity or pollution. Therefore, apparatus 21 may alternately serve as a self-powered sensor component.

Figure 8:
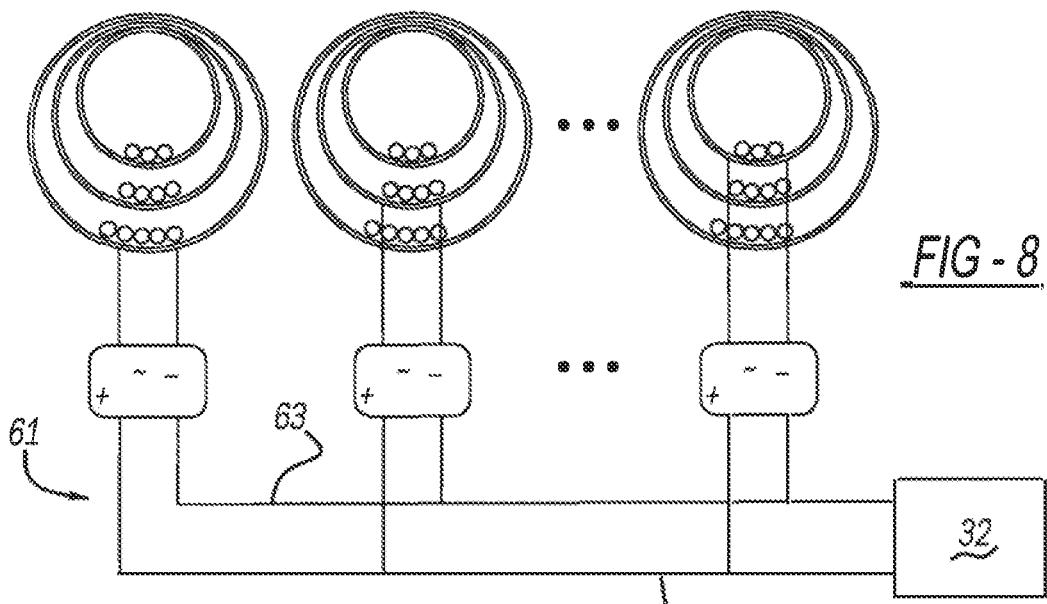
FIG. 8 is an electrical diagram for multiple shells of the present apparatus.

HS-TENG apparatus 21 harvests mechanical energy to charge energy storage unit 32 and power electronics (also designated as reference number 32), forming a self-powered electronics system. FIGS. 7 and 8 show schematic diagrams for circuit 61 of a self-powered system, which includes conductors 63, a resister 65, rectifier 67, a storage capacitor 69, and two switches 71 and 73. Conductors 63 may be insulated wires, stamped metallic conductors, printed circuit traces, or the like. The rectifier is used to convert alternating current (AC) electricity to direct current (DC) electricity. The working mechanism for this circuit is: firstly, when switch 71 is on and 73 is off, storage capacitor 69 is charged by the HS-TENG and its voltage is monitored by a voltmeter 75. Then, when the voltage is charged to a specific value, switch 73 is turned on and the stored energy is discharged to drive a connected electronic device such as at unit 32.

It is envisioned that for charging voltages of a 2.2 µF capacitor as a function of the charging time under different frequencies, the charging rate is expected to increase with the frequency, and more energy should be harvested with a higher frequency. Thus, at a frequency of 2.5 Hz, the capacitor can be charged to 9 V within 30 s. It is also envisioned that for charging curves of different capacitors charged by the present HS-TENG apparatus at 2 Hz, and with the same charging time, the charging voltage of the capacitors of 1 µF, 2.2 µF, 4.7 µF and 10 µF are expected to reach 13 V, 7 V, 3.4 V and 1.4 V, respectively. The smaller the capacitor, the higher the charging voltage and the faster the charging speed. In one example of the present self-powered system 21, the HS-TENG is utilized to charge a capacitor (10 µF) and then power an electronic watch. When the voltage of capacitor 69 reaches −1.6 V, the switch 73 is turned on so that the electronic watch can be activated to display the time. Due to the consumption of the stored electricity, the voltage of the capacitor starts to decrease. The voltage remains stable after 50,000 cycles at a frequency of 2 Hz.

Figure 9A:
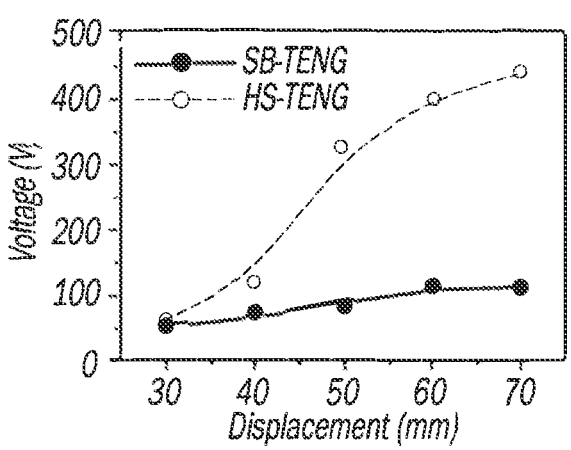
FIGS. 9A-I are graphs showing expected results of the present apparatus.
Figure 9B:
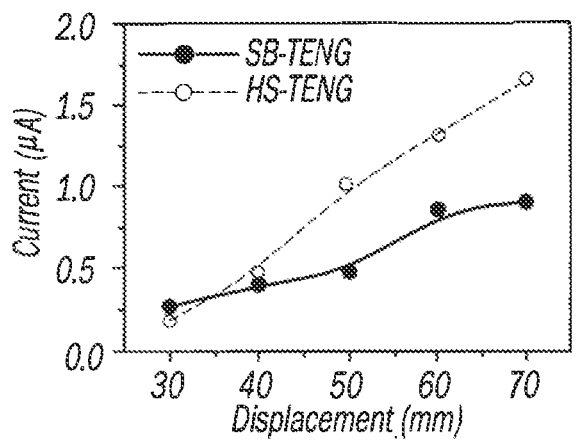
Figure 9C:
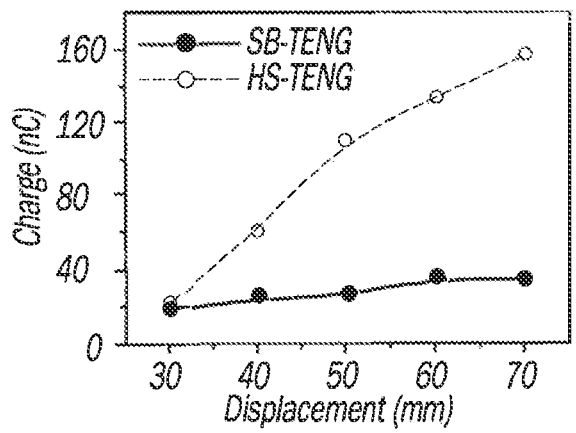
Figure 9D:
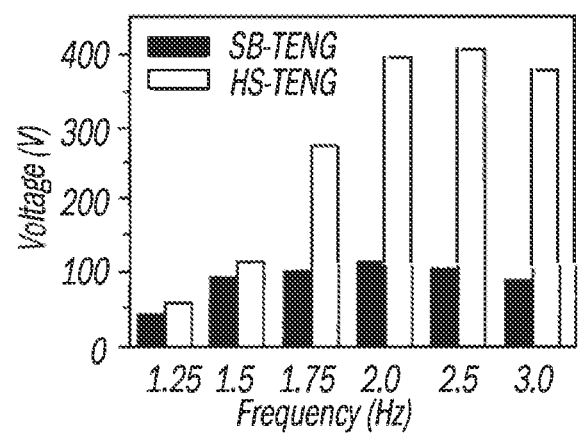
Figure 9E:
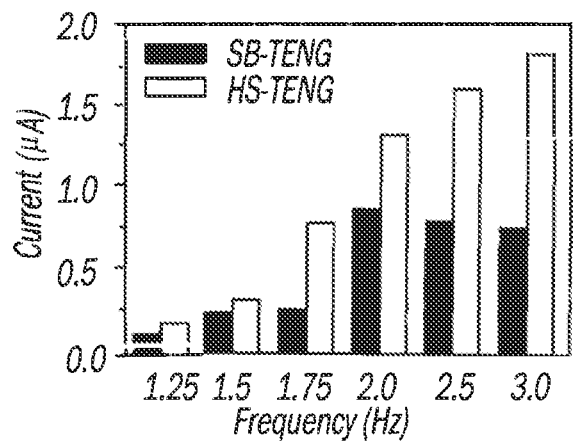
Figure 9F:
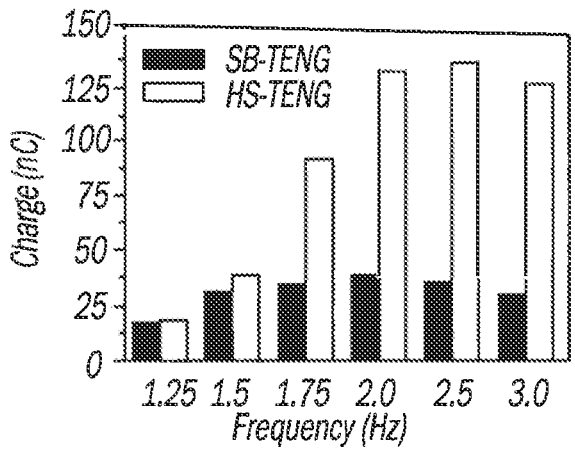
Figure 9G:
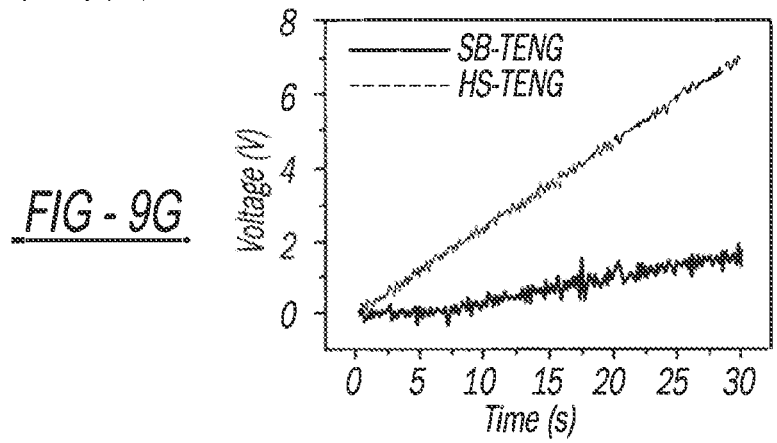

Constrained by the limited space between the neighboring shells in a HS-TENG, the optimal number for the moving balls in a 100 mm diameter TENG shell is approximately twenty. In the exemplary embodiment, an optimal HS-TENG apparatus 21 is fabricated by integrating three spherical TENG shells 25, 27 and 29 with the diameters of 60 mm, 80 mm and 100 mm. The expected output performance of the present HS-TENG is now compared to a single ball TENG ("SB-TENG") consisting of a pair of electrodes, an outer acrylic shell of 100 mm and an inner PTFE ball of 38 mm. As shown in FIG. 9A, at a small displacement amplitude of 30 mm, the HS-TENG does not exhibit superior performance because the large moving ball in the SB-TENG can roll more easily than the multiple smaller moving balls, which may have larger friction force between the balls and the electrodes. With the increase of the displacement amplitude, Voc, Isc and Qsc of the present HS-TENG exhibit a significant increase, while the Voc and Qsc of the SB-TENG maintain a much lower change, and the Isc of the SB-TENG is also much lower than that of the present HS-TENG. Besides the displacement amplitude, the output performances of the HS-TENG and SB-TENG under different frequencies are also compared as displayed in FIGS. 9D-9F. The variation trend of the output performance of the SB-TENG is similar with that of the HS-TENG. However, the output performance of the present HS-TENG completely exceeds that of the SB-TENG at the same frequency owing to the large contact area. The HS-TENG and BS-TENG are used to charge a capacitor (2.2 µF) under a frequency of 2 Hz. As presented in FIG. 9G, the voltage of the capacitor can be charged to around 7 V by the present HS-TENG but only 1.5 V by the SB-TENG, in 30 s. Based on the expected charging curves, the output energy values of these two devices are calculated via the equation: $E=CU^2/2$, where C is the capacitance of the capacitor and U is the voltage. The output energy of the SB-TENG is about 2.5 µJ, while that of the HS-TENG is 54 µJ, which is 21.6 times higher in magnitude. Compared with SB-TENG, the present HS-TENG with the same volume (size) is expected to demonstrate higher space utilization and better output performance.

Figure 9H:
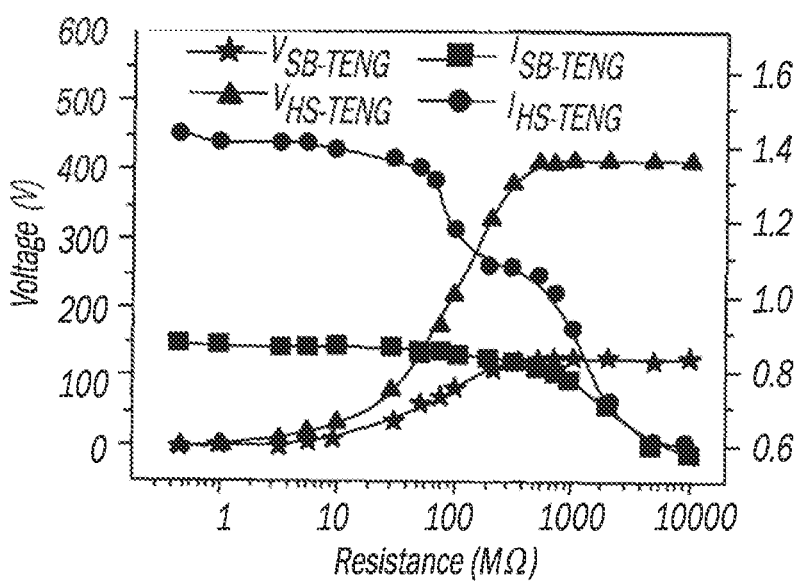
Figure 9I:
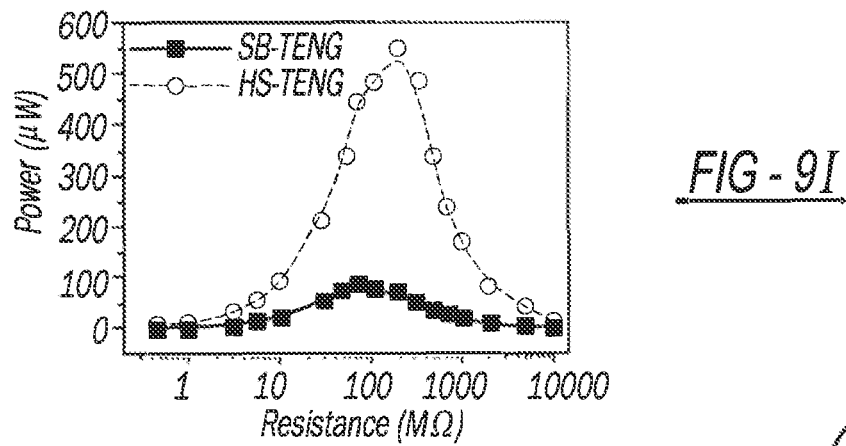

FIG. 9H shows both the expected effective values of output voltage and current of the present HS-TENG and SB-TENG under different resistance loads from 470 KΩ to 10 GΩ. The output voltages of these two types of TENGs increase with the increasing resistance loads while the output currents exhibit a reverse trend. Both the voltage and current reach a plateau saturation when the resistance is considerably large, and the saturation values of the HS-TENG are far larger than those values of the SB-TENG. Furthermore, FIG. 4I shows output powers of the present HS-TENG and SB-TENG as a function of the external resistance. A maximum output peak power of 82.5 µW should be obtained when the external resistance is ~70 MΩ for the BS-TENG, while the maximum output peak power of the present HS-TENG is expected to reach 544 µW with a matched resistance of ~200 MΩ; a more than six times improvement. Therefore, the present HS-TENG apparatus 21 should have a much greater output performance than SB-TENG and its use will significantly increase the water wave energy harvesting performance for a TENG network in the ocean.

One exemplary fabrication method for the present apparatus 21 is set forth as follows. First the shells are injection molded, vacuum formed onto a mold, three-dimensionally printed, or the like. Copper conductive paint is then painted on the interior surface of each acrylic shell and then the shells are cured for 30 minutes at a temperature of 60° C. Alternately, the electrode material may be sprayed or sputter coated onto the shells. Optionally, silver nanowires may be attached to the interior surfaces of the shells to act as the electrodes, which are more compliant, thereby being more durable if shell deformation occurs. Two insulated wires are connected respectively to each pair of electrodes. Thereafter, the PTFE balls, such as can be obtained from the United States Plastic Corporation, are placed in the shells. The balls are preferably solid but may alternately be hollow to reduce weight. During nesting of the shells and balls, each of the edges of the shells are subsequently sealed by an adhesive (METALSET A4) and cured at room temperature for twenty-four hours. The smallest innermost shell is affixed to the surrounding bigger shells using a heated adhesive and electrically connected in parallel. Finally, a mass or weight is optionally bonded on the bottom of the outermost shell using an adhesive to create a top/bottom orientation in use.

Figure 10:
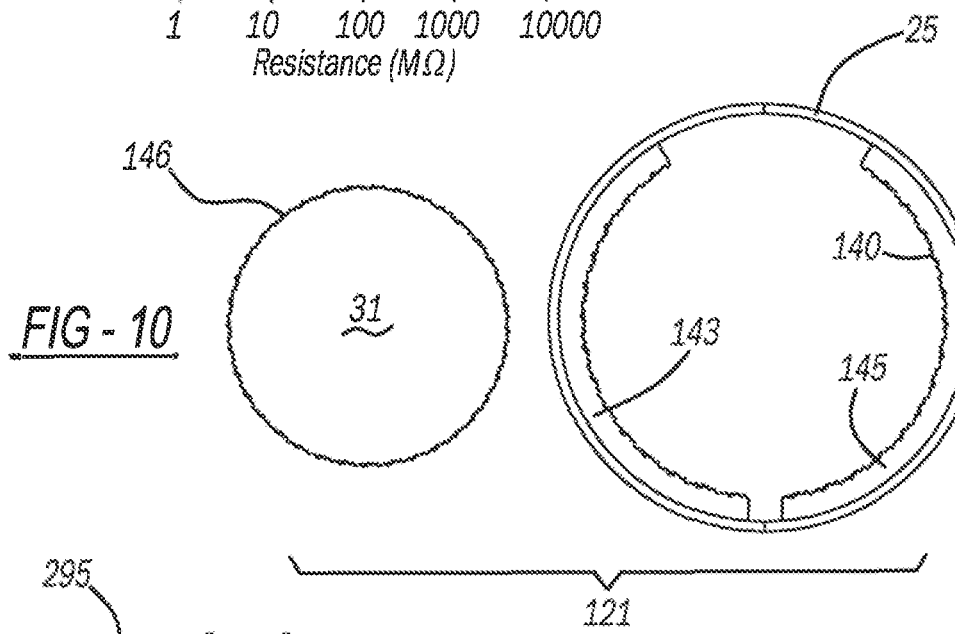
FIG. 10 is a diagrammatic view showing a variation of each ball and shell of the present apparatus.

FIG. 10 illustrates another embodiment of HS-TENG apparatus 121. Inner surfaces 140 of electrodes 143 and 145, and outer surfaces 146 of balls 31 (only one ball being shown in an exaggerated size) have a rough, patterned and non-smooth configuration. These rough surfaces enhance friction during movement of the balls within the respective shell(s) which may also enhance the synergistic triboelectrification and electrostatic induction created therebetween. The surface pattern may be wrinkled, stippled, grooved or the like through different kinds of methods.

Figure 11:
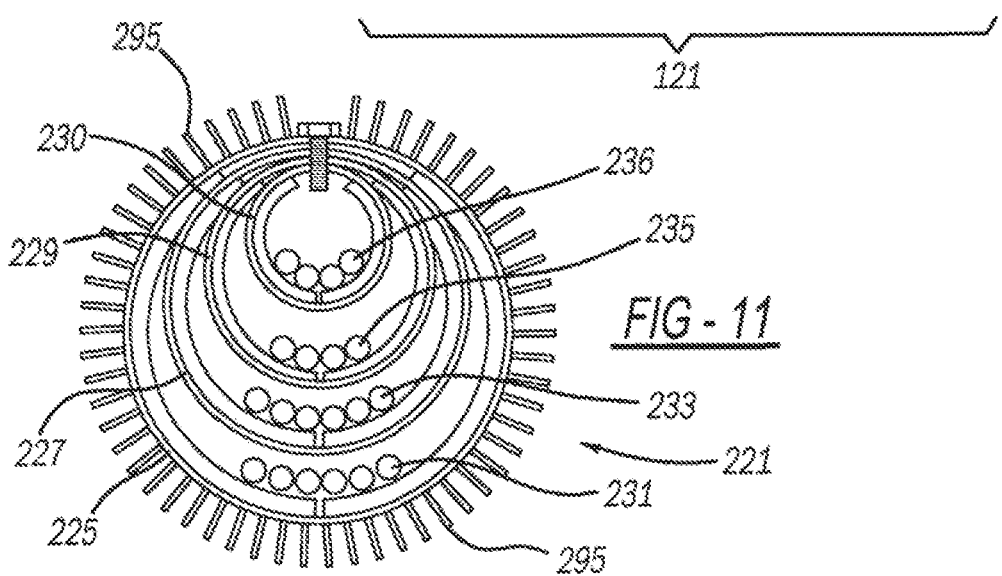
FIG. 11 is a diagrammatic view showing another variation of the present apparatus.

FIG. 11 shows another embodiment of the present HS-TENG apparatus 221. Four nested sets of shells 225, 227, 229 and 230, and balls 231, 233, 235 and 336, are employed with associated spaced apart electrodes. Thus, at least two nested shells are desired, but the more, the better from an electricity generation standpoint. Optionally, external fins, grooves, fingers or other protruding and spaced apart structures 295 project outwardly from outer shell 225. These structures 295 cause greater frictional engagement with the wave water, thereby generating more movement.

Figures 12, 13, 14:
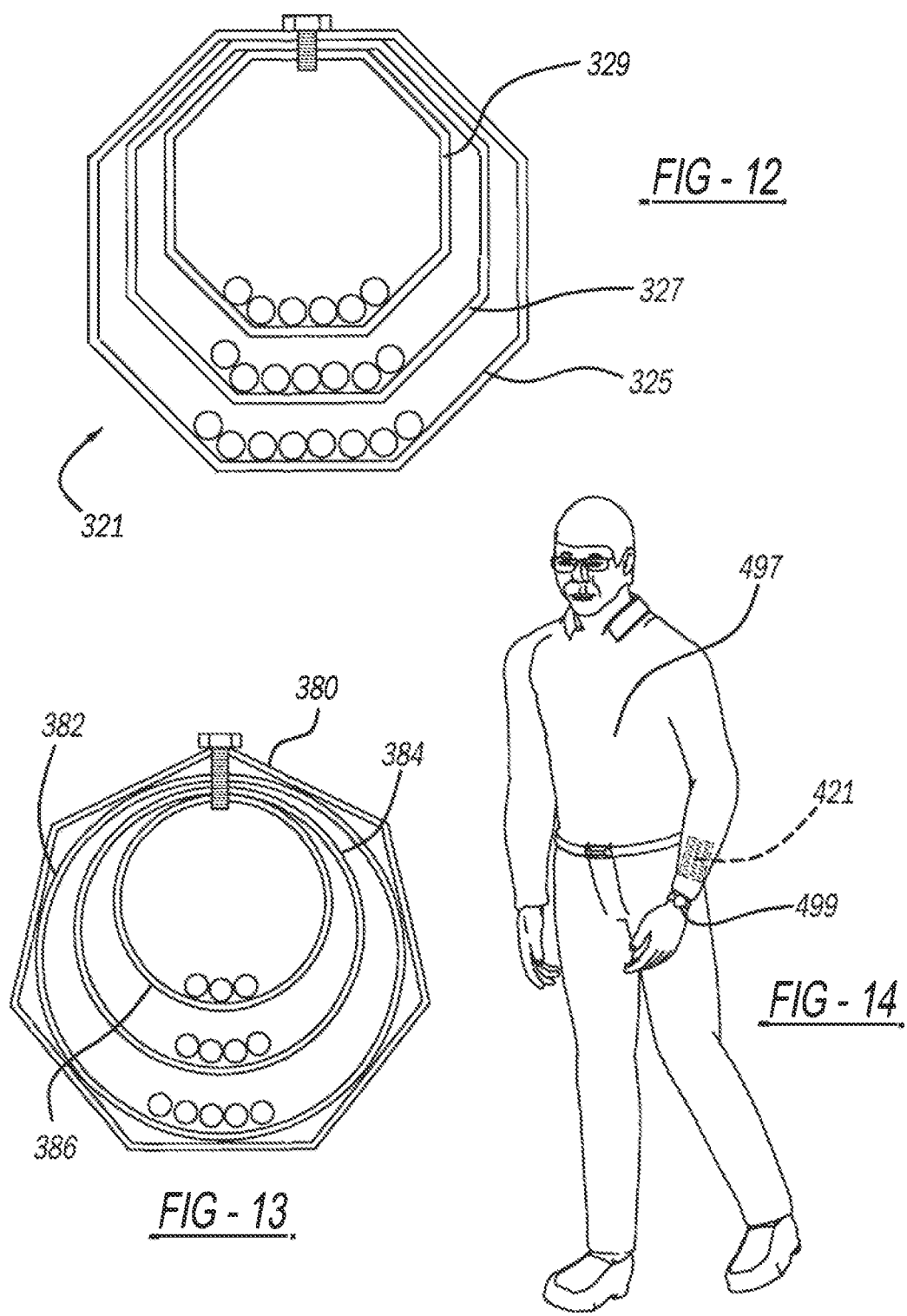
FIG. 12 is a diagrammatic view showing a third variation of the present apparatus.
FIG. 13 is a diagrammatic view showing a fourth variation of the present apparatus.
FIG. 14 is a perspective view showing a human-wearable embodiment of the present apparatus.

Referring to FIG. 12, other shell shapes may be used for the present HS-TENG apparatus 321. For example, octagonal shells 325, 327 and 329 are provided. Other polygonal or ovalular curved, enclosed shapes can alternately be employed.

Furthermore, FIG. 13 shows another variation employing a polyhedral outer shell 380 with spherical intermediate shells 382 and 384, and an innermost shell 386. The balls, electrodes and circuits for shells 382, 384 and 386 are otherwise the same as in prior embodiments. The outer shell shape provides an extra interface for engaging with the water motion.

Finally, a wearable generator or self-powered sensor version of HS-TENG apparatus 421 is illustrated in FIG. 14. An array of coupled shells, electrodes and balls are attached to a user wearable garment, such as the illustrated shirt 497, or in pants, shoes, a belt, headwear, wrist band, backpack or the like. A single set of nested shell assemblies or an interconnected array can be utilized. Moreover, apparatus 421 may power a wearable or carriable electronic device unit 499 such as a watch, light, communication device, medical monitor or the like.

While various features of the present invention have been disclosed, it should be appreciated that other variations can be employed. For example, a greater or smaller quantity of moveable balls may be employed within each shell as long as there is more than one ball therein. As another example, different electrical circuitry may be provided, although certain advantages may not be realized. Alternate human-wearable clothing and garments may include the present apparatus, for example, the apparatus may be positioned in different locations within each garment from that illustrated, such as removable in a pocket, or sewn into an external or internal compartment; however, certain benefits may not be achieved. It is also envisioned that the present apparatus can be secured within water or other moveable fluids in manners other than that disclosed herein, but some benefits may not be obtained. Materials other than copper, PTFE and acrylic can be employed but certain advantages may not be realized. It should be appreciated that features of one embodiment may be interchanged with features of another embodiment in any combination and order (e.g., the projecting structures may be on a polygonal shell, or for only a two-shell combination, or the rough surfaces may be on a polygonal shell, etc.), and the claims may be multiply dependent upon each other and in any combination. Variations are not to be regarded as a departure from the present disclosure and all such modifications are intended to fall within the scope and spirit of the present invention.

What is claimed is:

1. A power generator apparatus comprising:
(a) a buoyant, waterproof and enclosed outer shell;
(b) at least one enclosed inner shell located within the outer shell;
(c) a first plurality of balls located between the outer and inner shells and being freely moveable to rotate therebetween;
(d) a second plurality of balls located within the inner shell and being freely moveable to rotate therein;
(e) a first set of spaced apart electrodes affixed to an interior surface of the outer shell;
(f) a second set of spaced apart electrodes affixed to an interior surface of the inner shell; and
(g) the shells being adapted to move due to exterior fluid movement which moves the first set of balls between the first electrodes and moves the second balls between the second electrodes to generate triboelectric charging.

2. The apparatus of claim 1, wherein the electrodes generate electricity in response to the rotation of the balls.

3. The apparatus of claim 1, wherein the electrodes act as a power source for sensors in response to the rotation of the balls.

4. The apparatus of claim 1, wherein each of the electrodes has a substantially hemispherical shape and the electrodes include a copper or copper-alloy paint directly deposited on an inside surface of the shells which are of a rigid polymeric material.

5. The apparatus of claim 1, wherein:
each of the electrodes is curved;
there are at least three of the balls, which are PTFE, within each of the shells; and
there are more of the first plurality of balls within the outer shell than there are of the second plurality of balls within the inner shell.

6. The apparatus of claim 1, wherein at least one of the shells has a substantially polygonal cross-sectional shape.

7. The apparatus of claim 1, further comprising:
at least one intermediate shell located between the inner and outer shells;
a third plurality of balls located between the intermediate and inner shells and being freely moveable to rotate therebetween; and
each of the shells having a different curved peripheral diameter.

8. The apparatus of claim 1, further comprising spaced apart projections outwardly and radially extending from the outer shell.

9. The apparatus of claim 1, wherein there is a rough pattern on at least one of: exterior surfaces of the balls or interior surfaces of the electrodes.

10. The apparatus of claim 1, wherein the nested shells float on or are submerged in water, and movement of the water moves the balls within the nested shells to generate electricity.

11. The apparatus of claim 1, further comprising:
a wearable garment to which is affixed the nested shells;
an electrical circuit connected to the electrodes; and
an electronic component being at least one of: a sensor, a light, a timer or a display, connected to the circuit and being powered by the balls moving within the nested shells.

12. A triboelectric apparatus comprising:
nested and enclosed shells;
sets of balls located between the shells, and one of the sets of balls being located internal to an innermost of the shells;
spaced apart electrodes located inside each of the shells against which the balls rotate; and
an electrical circuit coupled to the electrodes.

13. The apparatus of claim 12, wherein the electrodes generate electricity in response to the rotation of the balls.

14. The apparatus of claim 12, wherein the electrodes act as a power source for sensors in response to the rotation of the balls.

15. The apparatus of claim 12, wherein each of the shells includes two substantially hemispherical shaped and rigid parts within which is deposited the electrodes, and the shells are attached together by a common fastener.

16. The apparatus of claim 12, further comprising:
the nested shells comprise at least one intermediate shell located between an inner shell and an outer shell;
another set of balls located between the intermediate and inner shells and being freely moveable to rotate therebetween;
each of the shells having a different curved peripheral diameter with a spaced apart area therebetween;
each of the electrodes being curved;
there are at least three of the balls within each set; and
there are more of the balls between the outer and intermediate shells than there are within the inner shell.

17. The apparatus of claim 12, wherein the nested shells float on or are submerged in water, movement of the water moves the balls within the nested shells to generate electricity, and wires connect a spaced apart array of the nested shells to a remotely located, power storage unit.

18. The apparatus of claim 12, wherein the electrical circuit comprises a capacitor, the capacitor is one of:
at a frequency of 2.5 Hz, the capacitor is chargeable to 9 volts within 30 seconds; or
at a frequency of 2 Hz, the capacitor of one of: 1 µF, 2.2 µF, 4.7 µF or 10 µF is chargeable to 13 volts, 7 volts, 3.4 volts or 1.4 volts, respectively, within 30 seconds.

19. A power generator apparatus comprising:
multiple nested sets of electrodes coupled together, each of the nested sets of electrodes including spaced apart electrically conductive surfaces, and an outer one of the nested sets of electrodes having a larger periphery than and surrounding a periphery of an inner one of the nested sets of electrodes with a spaced apart area therebetween;
multiple moveable chargers, at least one of which being located in the area between each adjacent pair of the nested sets of electrodes, and at least another of which being located internal to the inner one of the nested sets of electrodes; and
each of the chargers being moveable between the electrically conductive surfaces of the associated nested sets of electrodes when the nested sets of electrodes are moved.

20. The apparatus of claim 19, wherein the chargers are electrically conductive and polymeric balls, and there are multiple of the balls rolling between the electrically conductive surfaces of each of the nested sets of electrodes.

21. The apparatus of claim 19, further comprising shells, the electrically conductive surfaces of each of the nested sets of electrodes being deposited on an internal surface of an associated one of the shells.

22. The apparatus of claim 19, wherein each of the electrically conductive surfaces has a substantially hemispherical shape with an open clearance at a top for insertion of a fastener.

23. The apparatus of claim 19, wherein each of the electrically conductive surfaces is curved and is a metallic paint deposited on an associated polymeric shell.

24. The apparatus of claim 19, wherein the nested sets of electrodes includes at least three nested sets of electrodes, each having a different curved peripheral diameter.

25. The apparatus of claim 19, wherein the electrodes generate electricity in response to the rotation of the balls.

26. The apparatus of claim 19, wherein the electrodes act as a power source for sensors in response to the rotation of the balls.

27. The apparatus of claim 19, further comprising:
 a wearable garment to which is affixed the nested sets of electrodes;
 an electrical circuit connected to the electrodes; and
 an electronic component being at least one of: a sensor, a light, a thermometer, or a timer, connected to the circuit and being powered by the chargers moving within the nested sets of electrodes.

\* \* \* \* \*